(12) United States Patent
Akiyama et al.

(10) Patent No.: US 7,243,113 B2
(45) Date of Patent: Jul. 10, 2007

(54) INFORMATION MANAGEMENT SYSTEM, INFORMATION MANAGEMENT METHOD, AND STORAGE MEDIUM FOR MANAGING EXECUTION RECORDS

(75) Inventors: Takashi Akiyama, Kawasaki (JP); Masaru Araki, Kawasaki (JP); Kazuya Omura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 10/625,354

(22) Filed: Jul. 23, 2003

(65) Prior Publication Data
US 2004/0122796 A1   Jun. 24, 2004

(30) Foreign Application Priority Data
Jul. 31, 2002   (JP) ............................. 2002-223547

(51) Int. Cl.
*G06F 17/30* (2006.01)

(52) U.S. Cl. .................................. 707/104.1; 707/100

(58) Field of Classification Search .............. 707/1–10, 707/100–104.1, 200–206; 434/323; 710/56; 718/102; 709/200
See application file for complete search history.

(56) References Cited

U.S. PATENT DOCUMENTS

| 5,896,530 A | * | 4/1999 | White | ......................... 718/102 |
| 6,947,956 B2 | * | 9/2005 | Olstad et al. | ............... 707/200 |
| 2003/0229650 A1 | * | 12/2003 | Olstad et al. | ............... 707/200 |

* cited by examiner

*Primary Examiner*—Diane Mizrahi
(74) *Attorney, Agent, or Firm*—Greer, Burns & Crain, Ltd.

(57) ABSTRACT

An information management system for managing the execution record of information processing includes a first storage unit, and a second storage unit storing the execution record at a lower speed than the first storage unit. An acquisition unit stores the execution record in the first and second storage units. An output unit refers to the execution record on the first or second storage unit and outputs the execution record to a predetermined output destination. A switching unit switches over the reference source of the execution record for the output unit between the first and second storage units.

6 Claims, 16 Drawing Sheets

INFORMATION MANAGEMENT SYSTEM, INFORMATION MANAGEMENT METHOD, AND STORAGE MEDIUM FOR MANAGING EXECUTION RECORDS

BACKGROUND OF THE INVENTION

1. Field of the Invention

The present invention relates to an information management system for managing execution records of information processing.

2. Related Background Art

A journal acquisition system for managing journals occurred from transaction processes may be exemplified as an information management system for managing the execution records of the information processing. This type of journal acquisition system has hitherto been applied to a case of structuring a new operation in a different category of operation within a server and in operations of other server by utilizing data of backbone system. The journal acquisition system is utilized, for example, in the case of gathering some items of information of the whole company on a division-by-division basis, i.e., when extracting a necessary database from within a plurality of databases.

Further, the journals occur from transaction processes and are therefore outputted in such a sequence that their transaction processes have been finished. Namely, the journals are edited for every utility purpose in the transaction process finishing sequence and outputted to external storage devices (journal utility files) coincident with their purposes.

Herein, the transaction is generally defined as a unit of processing in updating the database. The journal is defined as a result of processing of this transaction.

The control of this journal acquisition system aims at providing the journal to a user as soon as possible.

Then, the control of the journal acquisition system is executed in a way that refers directly to a buffer (a journal acquisition buffer) on a main memory stored with the journals occurred from the transactions.

A processing method in the conventional journal acquisition system will be described referring to FIG. 1. To start with, upon an end of a transaction 5, the journal is outputted to a journal acquisition buffer 12 (S101). Then, a journal acquisition unit 1 output the journal to a journal acquisition file 13 from on the journal acquisition buffer 12 (S102). Thereafter, the outputting of the journals to the journal acquisition file 13 from on the journal acquisition buffer 12 has been finished, thereby completing the transaction 5 (S103).

On the other hand, the journal acquisition unit 1, when finishing outputting of the journals to the journal acquisition file 13 from on the journal acquisition buffer 12, outputs the journals to a journal edit unit 3 from within the journal acquisition buffer 12 (S104).

Then, the journals edit unit 3 outputs the journals outputted from the journal acquisition unit 1 to journal utility files 6, corresponding their applications (S105)

Thus, the users set the journals in a status utilizable.

Further, a flow of the journals in the conventional journal acquisition system will be explained referring to FIG. 2.

Upon an end of a transaction T1, a journal J1 is outputted to the journal acquisition buffer 12 (S201), and the journal edit unit 3 outputs the journal J1 to the journal utility file corresponding to its application (S202).

When a different transaction T2 is finished in parallel with the process that the journal J1 is outputted to the journal utility file, a different transaction J2 is outputted to the journal acquisition buffer 12 (S203). Subsequently, this different journal J2 on the journal acquisition buffer 12 waits for being edited till the process of the journal J1 is terminated in the journal edit unit 3 (S204).

A memory space on the journal acquisition buffer 12 becomes deficient due to the process as executed in S204. Then, a journal J3 outputted from a transaction T3 with its processing finished waits for an available space on the journal acquisition buffer 12 (S205).

Therefore, the journal J3 of the transaction T3 with its processing finished is not outputted to the journal acquisition buffer 12. Thus, the processing of the transaction is delayed.

In the journal acquisition system according to the prior art, as a transaction quantity and a journal quantity increase, a quantity of the journals staying on the journal acquisition buffer rises.

Namely, the process that the journal edit unit edits the journal and outputs it to the journal utility file is time-consuming, and the journal on the journal acquisition buffer comes to a status of waiting for being edited. Then, the journals occurred as results of the transactions are successively stored on the journal acquisition buffer.

The quantity of the journals that can be handled by the journal acquisition buffer is limited, and hence, if the transaction quantity increases, the memory area of the journal acquisition buffer becomes deficient.

Accordingly, when there is a large transaction quantity, the journals from the transactions come to a status of waiting for being outputted. As a result, there arises a problem that a transaction processing time elongates, and a transaction throughput of the system as a whole decreases.

Namely, the processing of the journal edit unit is a bottleneck, then the processing of the transaction has been finished, and nevertheless the journal is kept in the status of waiting for the available space on the journal acquisition buffer. This leads to a delay of the transaction processing.

SUMMARY OF THE INVENTION

It is a primary object of the present invention, which was devised to obviate the problems inherent in the prior art described above, to provide a journal acquisition system capable of providing a user with journals in a way that restrains an increase in transaction processing time and a decrease in throughput due to the journals waiting for being edited even when there are large quantities of transactions and journals as well.

To accomplish the above object, according to one aspect of the present invention, an information management system for managing an execution record of information processing includes a first storage unit, a second storage unit storing the execution record at a lower speed than by the first storage unit, an acquisition unit making the first storage unit and the second storage unit store the execution record, an output unit referring to the execution record on the first or second storage unit, and outputting the execution record to a predetermined output destination, and a switching unit switching over the reference source of the execution record for the output unit between the first and second storage units.

With this architecture, normally the output unit refers to the execution record on the first storage unit capable of storing at higher-speed than by the second storage unit, and the switching unit, if there is a large quantity execution records, switches over a reference source to the second storage from which the output unit refers to the execution record.

This scheme makes it possible to restrain the processing of the whole the information processing system from being delayed due to the execution records staying on the first storage unit because of the large quantity of execution records.

Herein, the first storage unit indicates, for example, a high-speed main storage device having a small capacity, i.e., a journal acquisition buffer, etc. Further, the second storage device indicates, for instance, an intermediate-speed external storage device having a large capacity, i.e., a journal acquisition file, etc.

Moreover, the output unit edits the execution record referred to, and outputs this execution record to a predetermined output destination. Accordingly, the output unit is also called a journal edit unit. Herein, the predetermined output destination implies an external storage device for storing the edited journals for every utility purpose of the user. To be specific, the predetermined output destination is, e.g., a journal utility file, etc.

With this architecture, there increases a throughput of the transactions, i.e., a quantity of the transactions for managing the execution records such as journals, and, even if there occurs a deficiency in memory space of the journal acquisition buffer, it is possible to automatically switch over a method of fetching the journal directly from the journal acquisition buffer and editing it to a method of fetching the journal from the journal acquisition file and editing it.

This scheme enables the journal acquisition buffer to be used and prevent a delay of outputting the journals from the transactions. Namely, the transaction processing can be restrained from being delayed due to a status of waiting for an available space of the journal acquisition buffer for outputting the journal in spite of having terminated the transaction processing.

Note that the journal from the journal acquisition file at this time is, as in the case of editing the journal from the journal acquisition buffer, edited in the background separately from the transaction.

The information management system according to the present invention may further include a monitoring unit monitoring a state of use of the first storage unit, and the monitoring unit may include a determining unit determining the reference source of the execution record for the output unit in accordance with the state of use of the first storage unit. The switching unit may include a switching module dynamically switching over the reference source of the execution record for the output unit on the basis of the determining unit.

With this architecture, the state of use of the first storage unit, which is a cause of delaying the processing of the whole information processing system, can reflect in switching over the execution record reference source.

This enables the information management system to output the execution record to the predetermined output destination in a smoother state.

Namely, the state-of-use monitoring unit for the journal acquisition buffer, when judging that the available memory space of the journal acquisition buffer is deficient, determines that the journal acquisition source storage unit is switched over to the journal acquisition file from the journal acquisition buffer. Then, the state-of-use monitoring unit instructs the journal edit unit to switch over the journal acquisition source storage unit.

Based on this instruction, the journal edit unit switches over the journal acquisition source storage unit to the journal acquisition file from the journal acquisition buffer.

With this architecture, the state of use of the journal acquisition buffer can reflect in automatically switching over a method of fetching the journal directly from the journal acquisition buffer and editing it to a method of fetching the journal from the journal acquisition file and editing it. This scheme enables the journal to be provided to the user by eliminating an influence on a transaction performance.

Further, the information management system according to the present invention may further include a check unit checking excess and a deficiency of the execution record referred to by the output unit. The check unit may include an assigning module assigning an identification number to the execution record stored on the first storage unit, a reading module referring to an identification number of the execution record outputted by the output unit, and a comparing module comparing the identification number assigned to the execution record with the identification number of the execution record outputted by the output unit.

This architecture makes it feasible to prevent the execution records acquired by the output unit from becoming excessive and deficient. Herein, a check of the excess and the deficiency of the execution records imply a check of whether the execution records are missing and redundant in order to prevent the necessary execution records from being missing and from redundantly being edited and outputted. Further, the assignment of the identification number implies assigning serial numbers to the respective execution records.

This architecture enables the information management system to output the execution records to the predetermined output destination in the smoother state. That is, the information management system of the present invention is capable of eliminating the influence on the transaction performance while continuing to provide the user with the journals.

Moreover, in the information management system according to the present invention, the check unit may include a determining module determining the reference source of the execution record for the output unit in accordance with the check of the excess and the deficiency of the execution record by the excess/deficiency check unit, and the switching unit may include a switching module dynamically switching over the reference source of the execution record for the output unit on the basis of the determining module.

Namely, the excess/deficiency check unit, when detecting that the execution record is missing, determines that the output unit switches over the record acquisition source storage unit to the second storage unit from the first storage unit. Then, the excess/deficiency check unit instructs the output unit to switch over the execution record acquisition source to the second storage unit.

This architecture makes it feasible to prevent the execution records acquired by the output unit from becoming excessive and deficient. At the same time, it is possible to automatically switch over the method of fetching the journal directly from the first storage unit and editing it to the method of fetching the journal from the second storage unit and editing it.

This scheme enables the elimination of the influence upon the performance of the whole information processing system while continuing to provide the user with the execution records, and the first storage unit becomes usable, whereby it does not happen that the output to the first storage unit from the information processing system is delayed.

Further, according to the present invention, there may be provided a program running on a computer to actualize any one of the functions described above. There may also be provided a program running on the computer, other devices or machines, etc. to actualize any one of the functions, steps or processes described above. There may be further provided a readable storage medium stored with the program described above.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

A journal acquisition system will hereinafter be described by way of a preferred embodiment of the present invention with reference to FIGS. 3 through 14.

<System Architecture>

Figure 1:
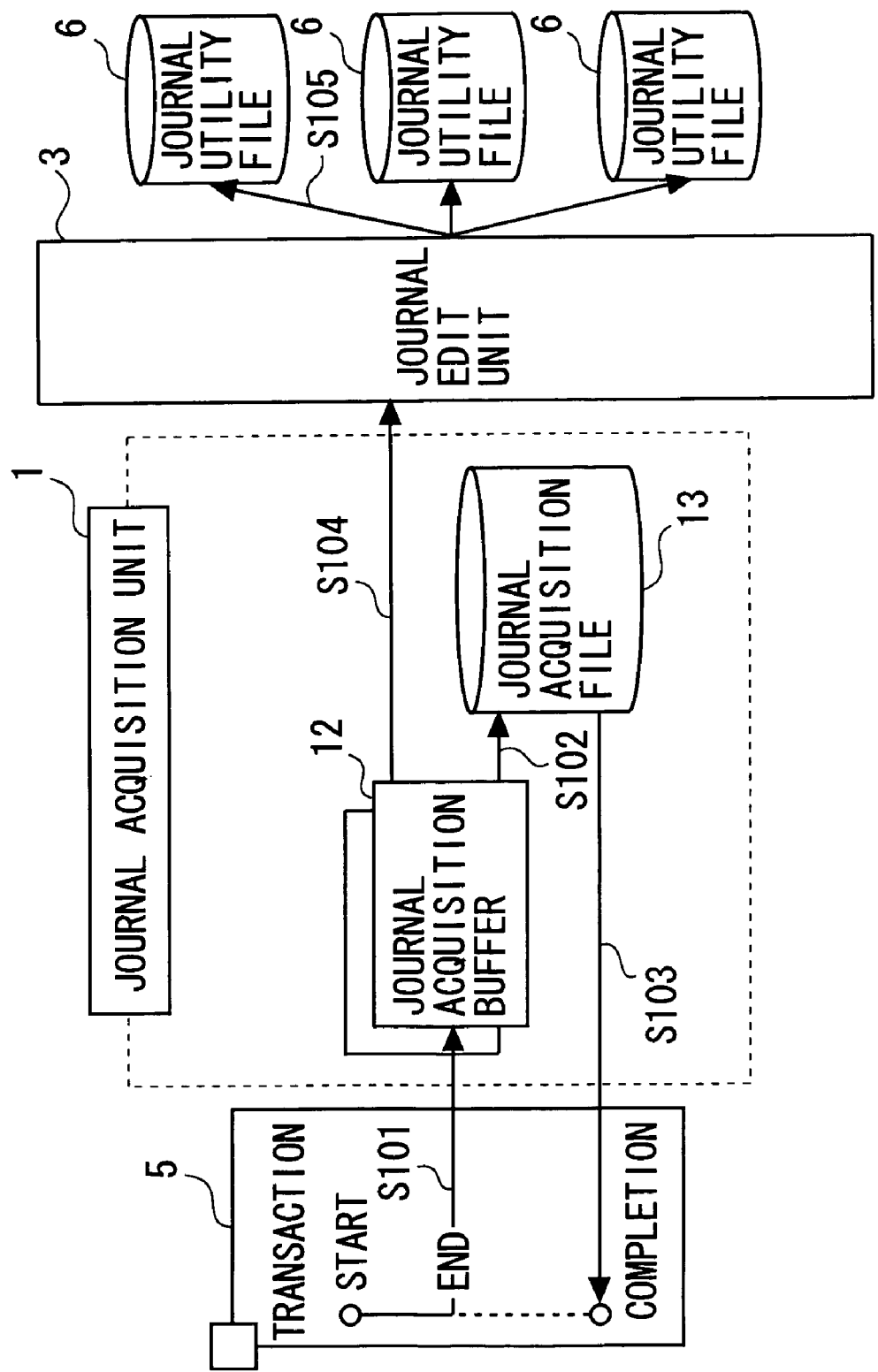
FIG. 1 is a diagram showing a conventional journal acquisition system.
Figure 2:
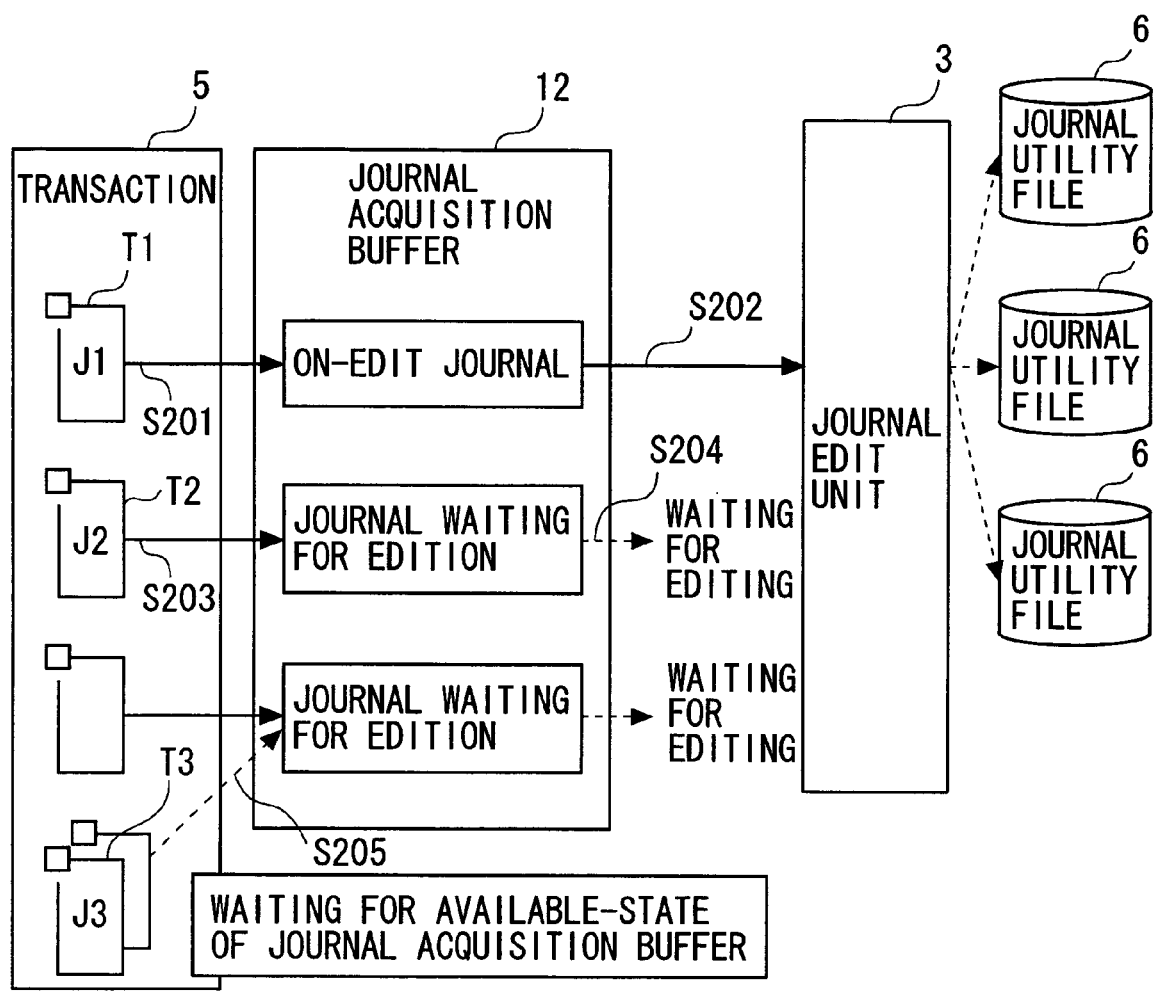
FIG. 2 is a diagram showing a flow of journals in the conventional journal acquisition system.
Figure 3:
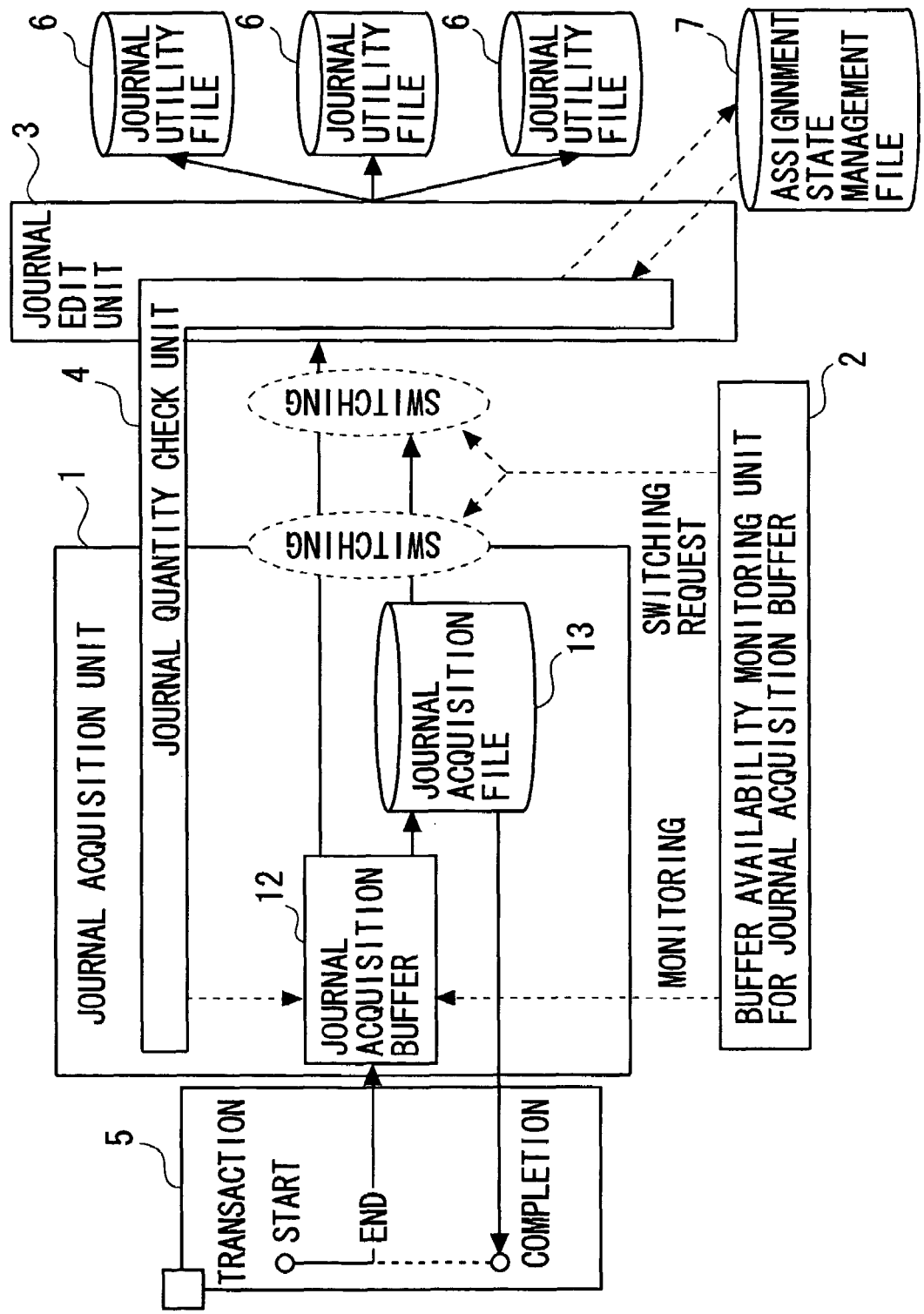
FIG. 3 is a diagram showing architecture of a journal acquisition system.

To start with, architecture of the journal acquisition system will be explained referring to FIG. 3. The journal acquisition system in this embodiment includes a journal acquisition unit 1, state-of-use (availability) monitoring unit 2 for a journal acquisition buffer, a journals edit unit 3, and a journal quantity check unit 4.

The present journal acquisition system acquires a journal outputted from a transaction processing system for executing a transaction. The journal acquisition system may be actualized either on a computer different from this transaction processing system or by its being built into this transaction processing system. The following is an explanation of those components The journal acquisition unit 1 includes a journal acquisition buffer 12 and a journal acquisition file 13. The journal acquisition buffer 12 is defined as a main storage device for caching the journal outputted from a transaction 5. Further, a journal acquisition file 13 is defined as an external storage device for storing the journal on the journal acquisition buffer 12.

To begin with, the journal acquisition unit 1 outputs the journal outputted from the transaction 5 to the journal acquisition buffer 12 and to the journal acquisition file 13.

In this process, the journal acquisition 1 searches out the journal acquisition buffer 12 having an available space when outputting the journal to the journal acquisition buffer 12. Then, the journal acquisition unit 1 outputs the journal to the journal acquisition buffer 12 having the available space.

Herein, the journal acquisition buffer 12 having the available space implies the journal acquisition buffer 12 having a memory area available for storing the journal.

On the other hand, the journals edit unit 3 reads the journal from on the journal acquisition buffer 12 and refers directly to the journal on the journal acquisition buffer 12.

Thus, the journal outputted to the journal acquisition buffer 12 is referred to directly by the journal edit unit 3. Hence, a high-speed journal edit can be actualized according to this embodiment.

Further, if the journal acquisition buffer 12 comes to a shortage of memory capacity due to increases in transaction quantity and in journal quantity as well, the journal edit unit 3 acquires and edits the journal outputted to the journal acquisition file 13 by the journal acquisition unit 1. Then, the journal edit unit 3 outputs the acquired journal to a journal utility file 6, corresponding to an application thereof.

Thus, a journal acquisition source from which the journal edit unit acquires the journal is switched over from the journal acquisition buffer 12 to the journal acquisition file 13, corresponding to the availability (memory capacity) of the journal acquisition buffer 12.

The switchover of the journal acquisition source is managed by the journal acquisition buffer availability monitoring unit 2.

The journal acquisition buffer availability monitoring unit 2 always monitors an available space of the journal acquisition buffer 12, which changes based on the transaction quantity and the journal quantity.

Then, the journal acquisition buffer availability monitoring unit 2 switches over, based on the monitored available space of the journal acquisition buffer 12, the journal acquisition source from which to acquire the journal, i.e., from the journal acquisition buffer 12 or from the journal acquisition file 13.

On the other hand, the journal edit unit 3 acquires, based on an instruction given from the journal acquisition availability monitoring unit 2, the journal from the journal acquisition buffer 12 or from journal acquisition file 13. Then, the journal edit unit 3 outputs the acquired journal to the journal utility file 6, corresponding to the application thereof.

Moreover, the journal quantity check unit 4, when the journal acquisition source is switched over as described above, checks how much a quantity of the journals to be processed is deficient or excessive. Herein, the check of the journal quantity (deficiency or excess) implies checking a leakage and redundancy of the journals to avoid the leakage of a necessary journal and a redundant edit of the journals.

Further, the journal quantity check unit 4 has a function of assigning serial numbers to the journals. Then, the journal quantity check unit 4 checks an excessive quantity and a deficient quantity of the journals based on the serial numbers. To be specific, the journal quantity check unit 4 manages the leakage and the redundancy of the journals on the basis of the serial numbers assigned to the journals. Note that a serial number assigning algorithm will be explained in detail with reference to FIG. 11.

The control of the journal acquisition system described above is actualized in any case by the computer including a CPU, a memory, a hard disk, a communication board, etc. A hardware architecture and operation of this type of computer are broadly known, and therefore their explanations are omitted.

<Operation>

Next, a processing method in each processing unit will be described referring to FIGS. 4 through 12.

<Operation of Journal Acquisition Unit 1>

Figure 4:
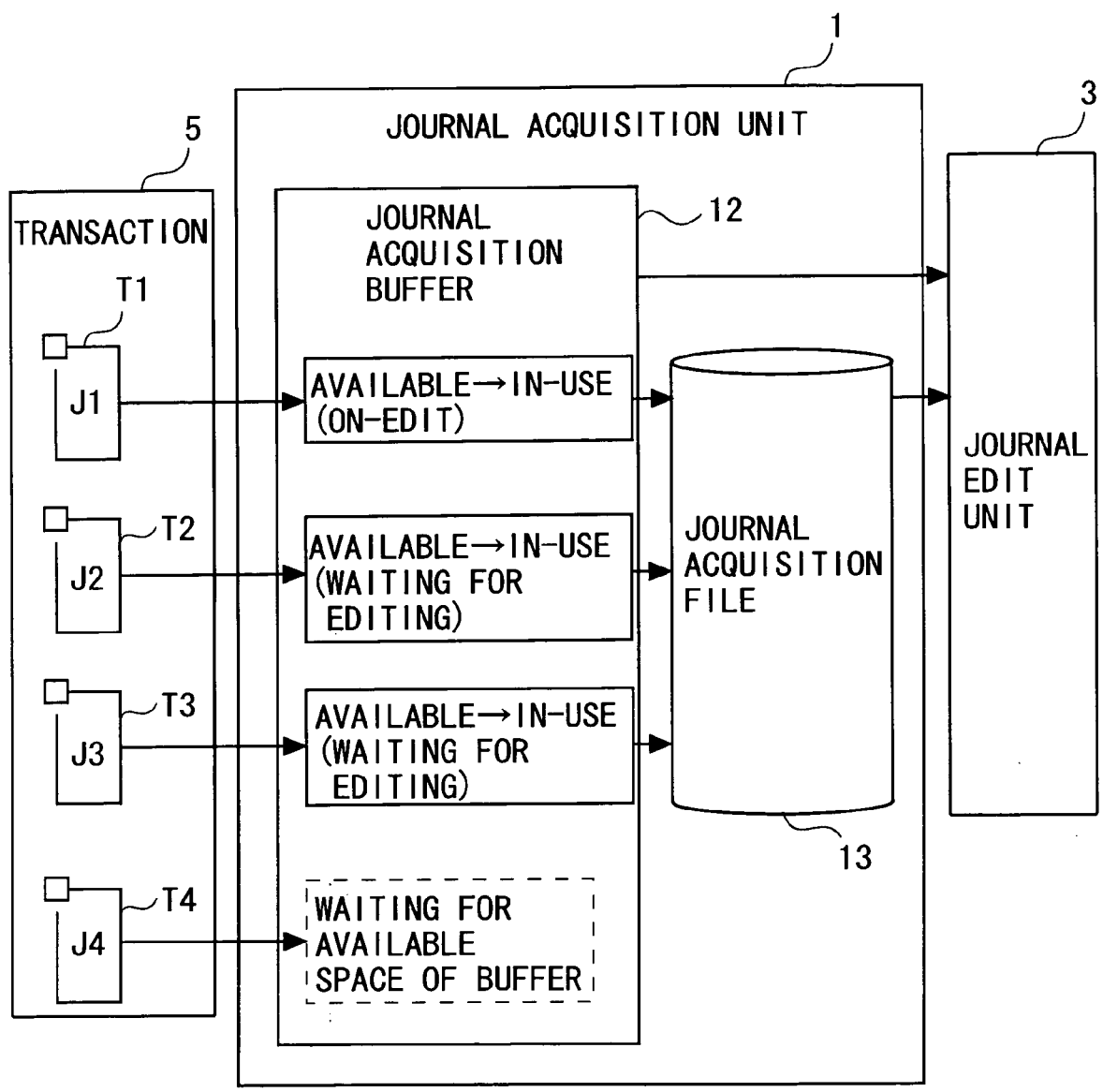
FIG. 4 is a diagram showing a processing method of a journal acquisition unit.

At first, the processing method of the journal acquisition unit 1 will be explained referring to FIGS. 4 and 5.

The journal acquisition unit 1 outputs the journal outputted from the transaction 5 to the journal acquisition buffer 13 and to the journal acquisition file 13. The journals are outputted in such a sequence that transaction processes thereof have been finished. Namely, the journals are outputted from the transaction 5 in the sequence from the journal J1 down to J4. Then, journals J1 through J3 are stored on the journal acquisition buffer 12 and outputted to the journal acquisition file 13.

Herein, a transaction T4 is in a status of waiting for an available space of the journal acquisition buffer 12 because of the journal acquisition buffer 12 having no available space to which the journal T4 is outputted.

Namely, the journal acquisition buffer 12 is stored with the journals J1 through J3 and is therefore deficient of its memory capacity, with the result that the journal J4 is not yet outputted from the transaction. This journal J4 is to be outputted to the journal acquisition buffer 12 just when the journal acquisition buffer 12 comes to a status of having the available space after the journal edit unit 3 has finished processing.

Figure 5:
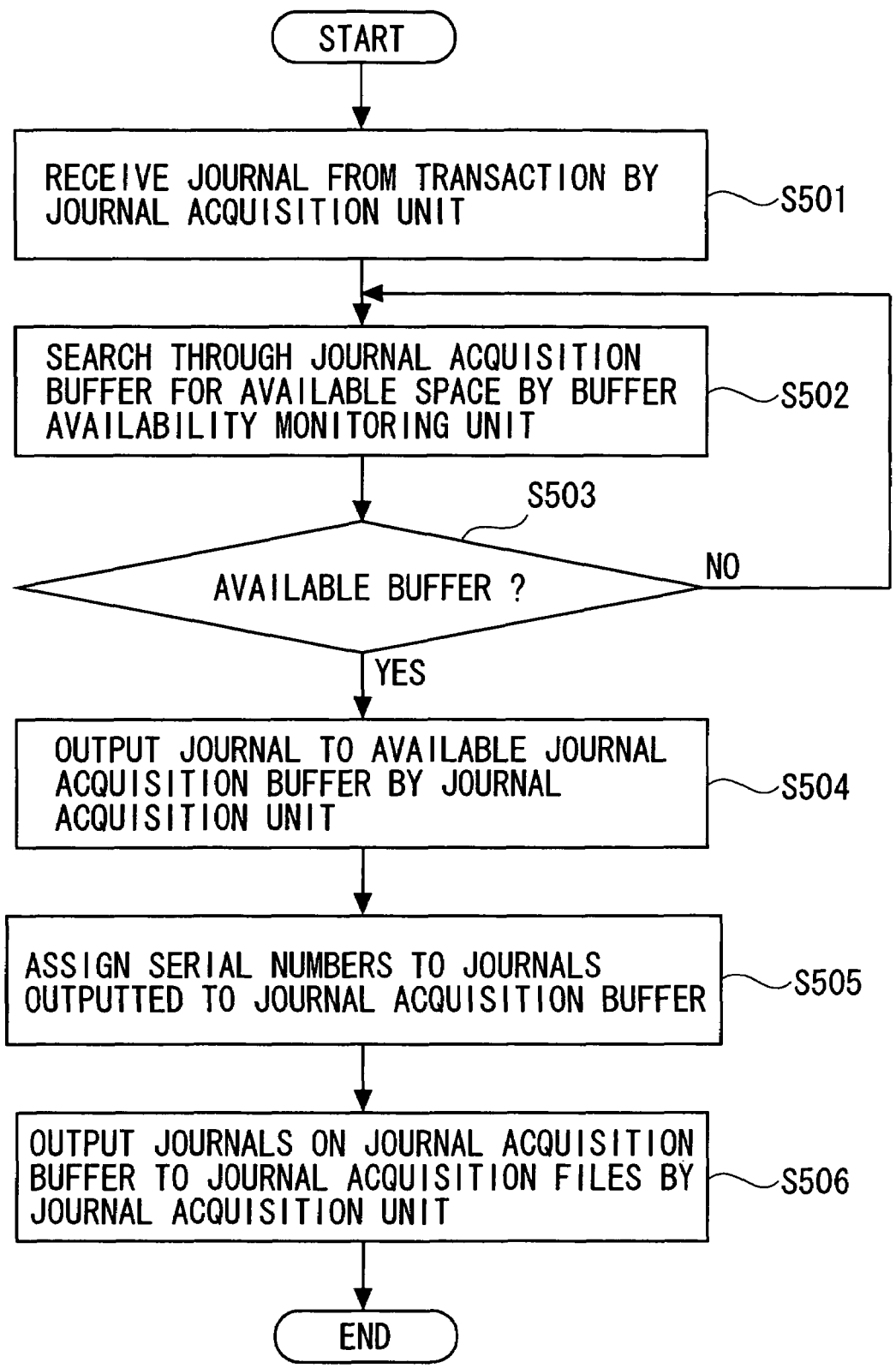
FIG. 5 is a flowchart showing the processing of the journal acquisition unit.

FIG. 5 shows a processing flow of the journal acquisition unit 1.

Upon the output of the journal from the transaction, the journal acquisition unit 1 starts processing.

To begin with, the journal acquisition unit 1 receives the journal outputted from the transaction (S501).

Then, the buffer availability monitoring unit 2 for the journal acquisition buffer 12 searches through the journal acquisition buffer 12 for an available space (S502). If the buffer availability monitoring unit 2 for the journal acquisition buffer 12 judges that there is the available memory space on the journal acquisition buffer 12, the journal acquisition unit 1 advances the processing to S504 (S503).

Whereas if the buffer availability monitoring unit 2 for the journal acquisition buffer 12 judges that there is no available memory space on the journal acquisition buffer 12, the journal acquisition unit 1 returns the processing to S502. Thus, the buffer availability monitoring unit 2 for the journal acquisition buffer 12 repeats the processing till the available area occurs within the journal acquisition buffer 12 (S503).

When judging in S503 that there is the available space on the journal acquisition buffer 12, the journal acquisition unit 1 outputs the journals to the journal acquisition buffer 12 in the available status (S504).

Then, the journal quantity check unit 4 assigns the serial numbers to the journals outputted in sequence to the journal acquisition buffer 12 (S505).

Thereafter, the journal acquisition unit 1 outputs the journals on the journal acquisition buffer 12 to the journal acquisition file 13 (S506), thereby terminating the processing.

<Operation of Buffer Availability Monitoring Unit 2 for Journal Acquisition Buffer 12>

Figure 6:
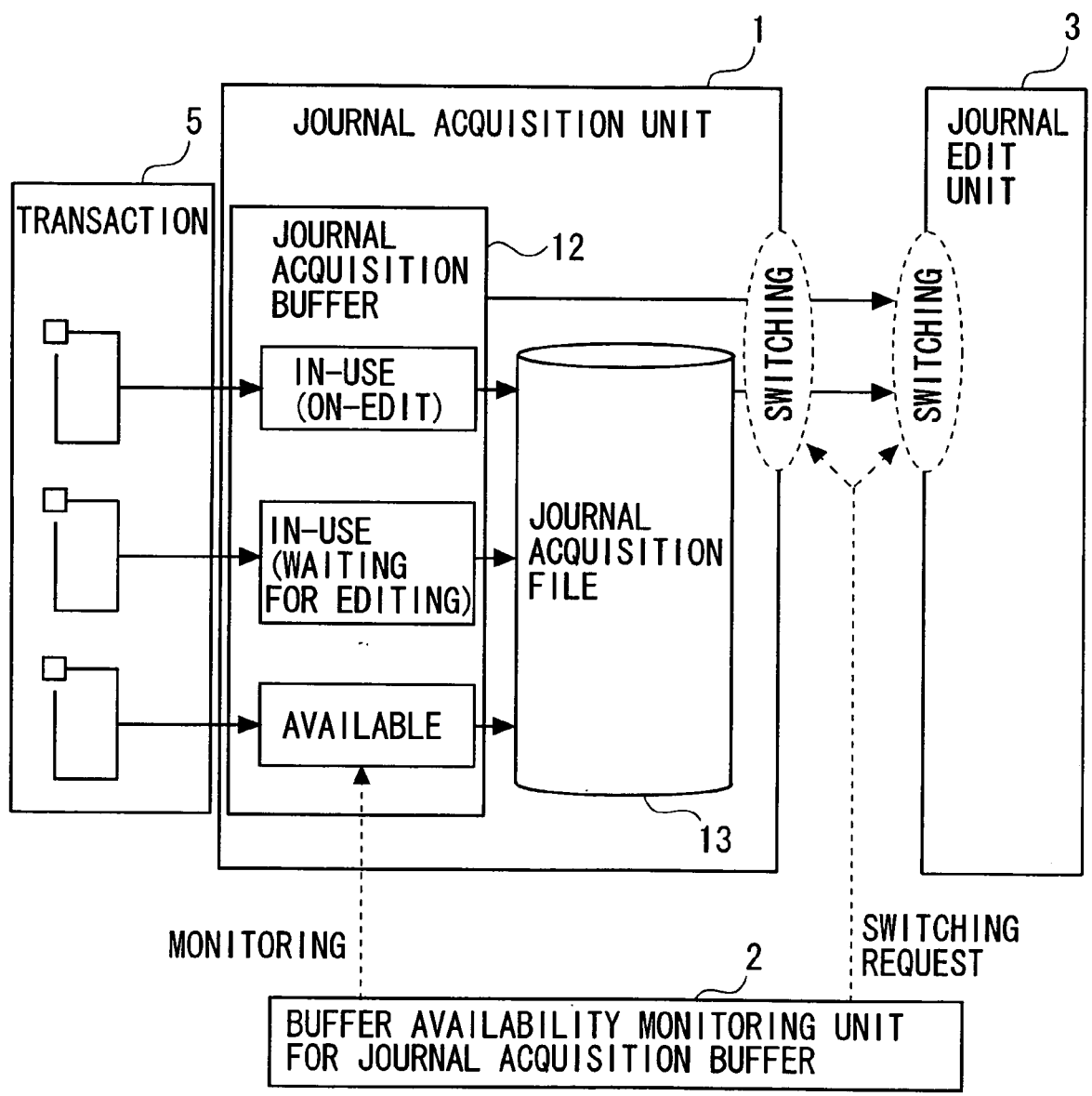
FIG. 6 is a diagram showing a processing method of a buffer availability monitoring unit.

A processing method of the buffer availability monitoring unit 2 for the journal acquisition buffer 12 will be explained referring to FIGS. 6 and 7.

The journal acquisition buffer availability monitoring unit 2 monitors the availability of the journal acquisition buffer 12, which changes based on the transaction quantity.

Further, the buffer availability monitoring unit 2 for the journal acquisition buffer 12 executes a process of switching over the journal acquisition source, corresponding to the availability of the journal acquisition buffer 12. Herein, the availability of the journal acquisition buffer 12 is an activity ratio of the memory on the journal acquisition buffer 12. Namely, this is synonymous with the available status of the journal acquisition buffer 12.

Figure 7:
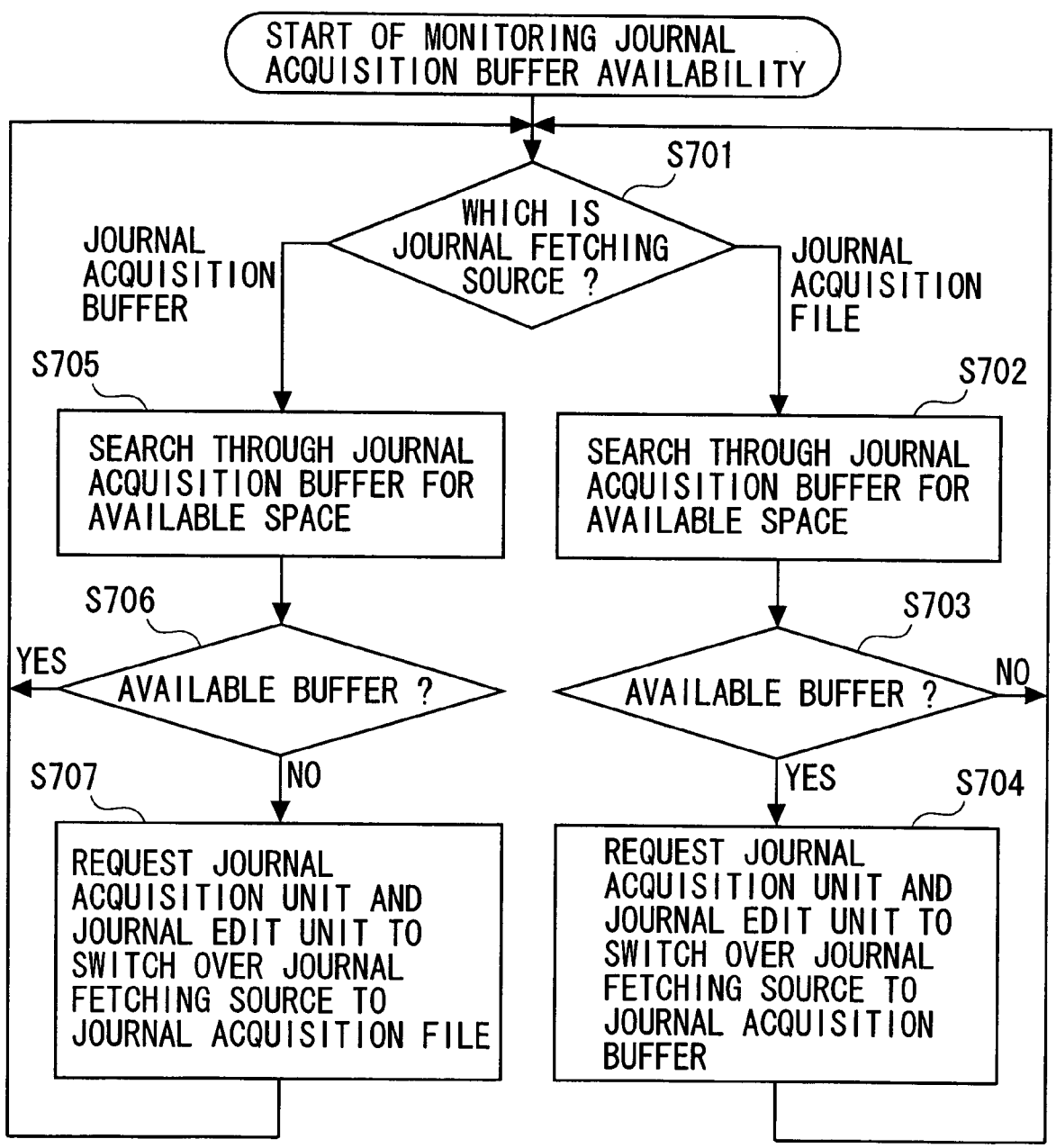
FIG. 7 is a flowchart showing the processing of the buffer availability monitoring unit.

FIG. 7 shows a processing flow of the buffer availability monitoring unit 2 for the journal acquisition 12.

The journal acquisition buffer availability monitoring unit 2 monitors the availability of buffer at all times.

At first, the journal acquisition buffer availability monitoring unit 2 judges whether the journal acquisition source of the journal outputted to the journal edit unit 3 is the journal acquisition buffer 12 or the journal acquisition file 13 (S701).

Herein, the journal acquisition buffer availability monitoring unit 2, when judging that the journal acquisition source of the journal outputted to the journal edit unit 3 is the journal acquisition file 13, searches through the journal acquisition 12 for the available space (S702).

Then, the journal acquisition buffer availability monitoring unit 2 judges whether there is the available space on the journal acquisition buffer (S703).

Herein, the journal acquisition buffer availability monitoring unit 2, when judging that there is the available space on the journal acquisition buffer 12, instructs the journal acquisition unit 1 and the journal edit unit 3 to switch over the journal acquisition source to the journal acquisition buffer 12 (S704).

Then, the journal acquisition buffer availability monitoring unit 2 loops back to S701 and waits for a next journal to be outputted.

While on the other hand, the journal acquisition buffer availability monitoring unit 2, when judging in S703 that there is no available space on the journal acquisition buffer 12, loops back to S701 and waits for a next journal to be outputted.

The journal acquisition buffer availability monitoring unit 2, when judging in S701 that the journal acquisition source of the journal outputted to the journal edit unit 3 is the journal acquisition buffer 12, searches through the journal acquisition 12 for the available space (S705).

Then, the journal acquisition buffer availability monitoring unit 2 judges whether there is the available space on the journal acquisition buffer (S706).

Herein, the journal acquisition buffer availability monitoring unit 2, when judging that there is no available space on the journal acquisition buffer 12, instructs the journal acquisition unit 1 and the journal edit unit 3 to switch over the journal acquisition source to the journal acquisition file 13(S707).

Then, the buffer availability monitoring unit 2 for the journal acquisition buffer 12 loops back to S701 and waits for a next journal to be outputted.

While on the other hand, the buffer availability monitoring unit 2 for the journal acquisition buffer 12, when judging in S706 that there is the available space on the journal acquisition buffer 12, loops back to S701 and waits for a next journal to be outputted.

<Operation of Journal Acquisition Edit Unit 3>

Figure 8:
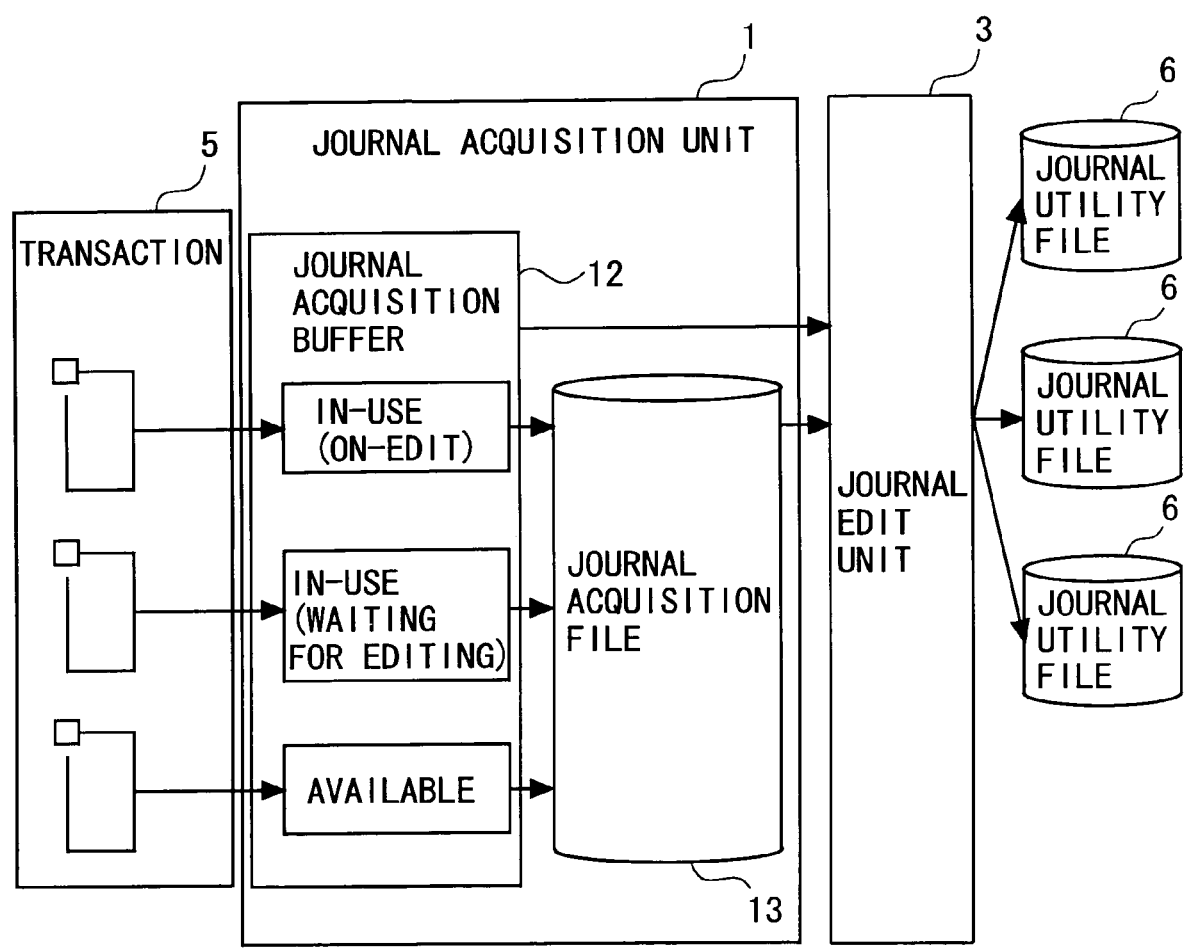
FIG. 8 is a diagram showing a processing method of a journal edit unit.

A processing method of the journal acquisition edit unit 3 will be described with reference to FIGS. 8 and 9.

The journals edit unit 3 fetches, based on the instruction given from the journal acquisition buffer availability monitoring unit 2, the journal from the journal acquisition buffer 12 or the journal acquisition file 13. Then, the journal edit unit 3 outputs the journal to the journal utility file 6, corresponding to the application thereof.

Figure 9:
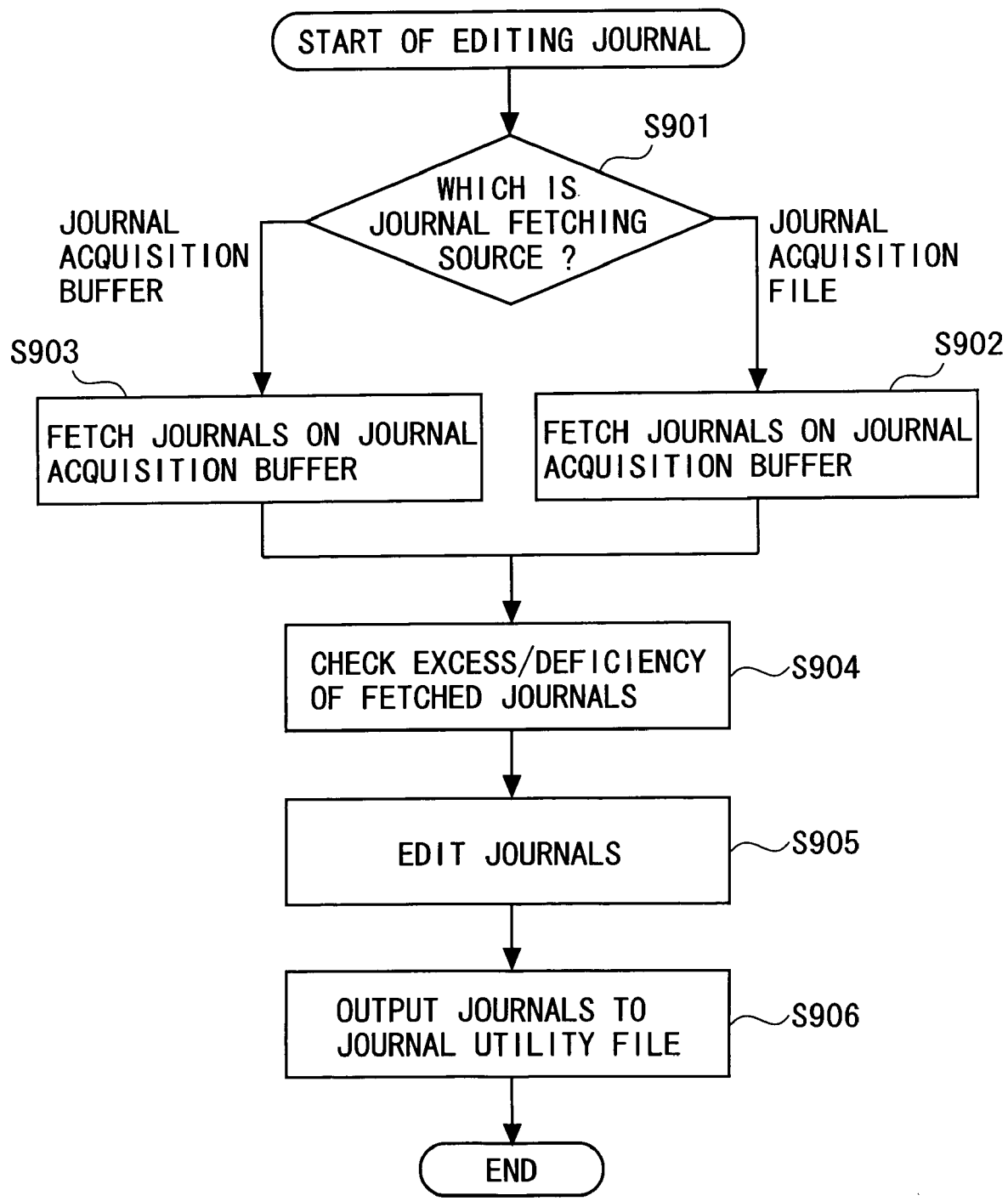
FIG. 9 is a flowchart showing the processing of the journal edit unit.

FIG. 9 shows a processing flow of the journal edit unit 3.

At first, the journals edit unit 3 judges whether the journal acquisition source of the journal acquired is the journal acquisition buffer 12 or the journal acquisition file 13 (S901).

Herein, the journal edit unit 3, when judging that the journal acquisition source is the journal acquisition file 13, advances the processing to S902.

Then, the journal edit unit 3 fetches the journal from on the journal acquisition file 13 (S902).

Note that the read from the journal acquisition file is executed in the sequence from its storage locations mapping to the journal serial numbers set on an assignment status management file 7 managed by the journal quantity check unit 4.

On the other hand the journal edit unit 3, when judging in S901 that the journal acquisition source is the journal acquisition buffer 12, fetches the journal from the journal acquisition buffer 12 (S903).

Then, the journal quantity check unit 4 checks how much the journals acquired are excessive or deficient. Herein, the excess and the deficiency of the journals imply that the journals outputted to the journal edit unit 3 are redundant and leaked out. Incidentally, a processing method of the journal quantity check unit will be described in depth later on with reference to FIGS. 10 through 12 (S904).

Subsequently, the journal edit unit 3 edits the journals (S905) and outputs the journals to the journal utility file 6 (S906).

Then, the journal edit unit 3 terminates the processing.

<Operation of Journal Quantity Check Unit 4>

Figure 10:
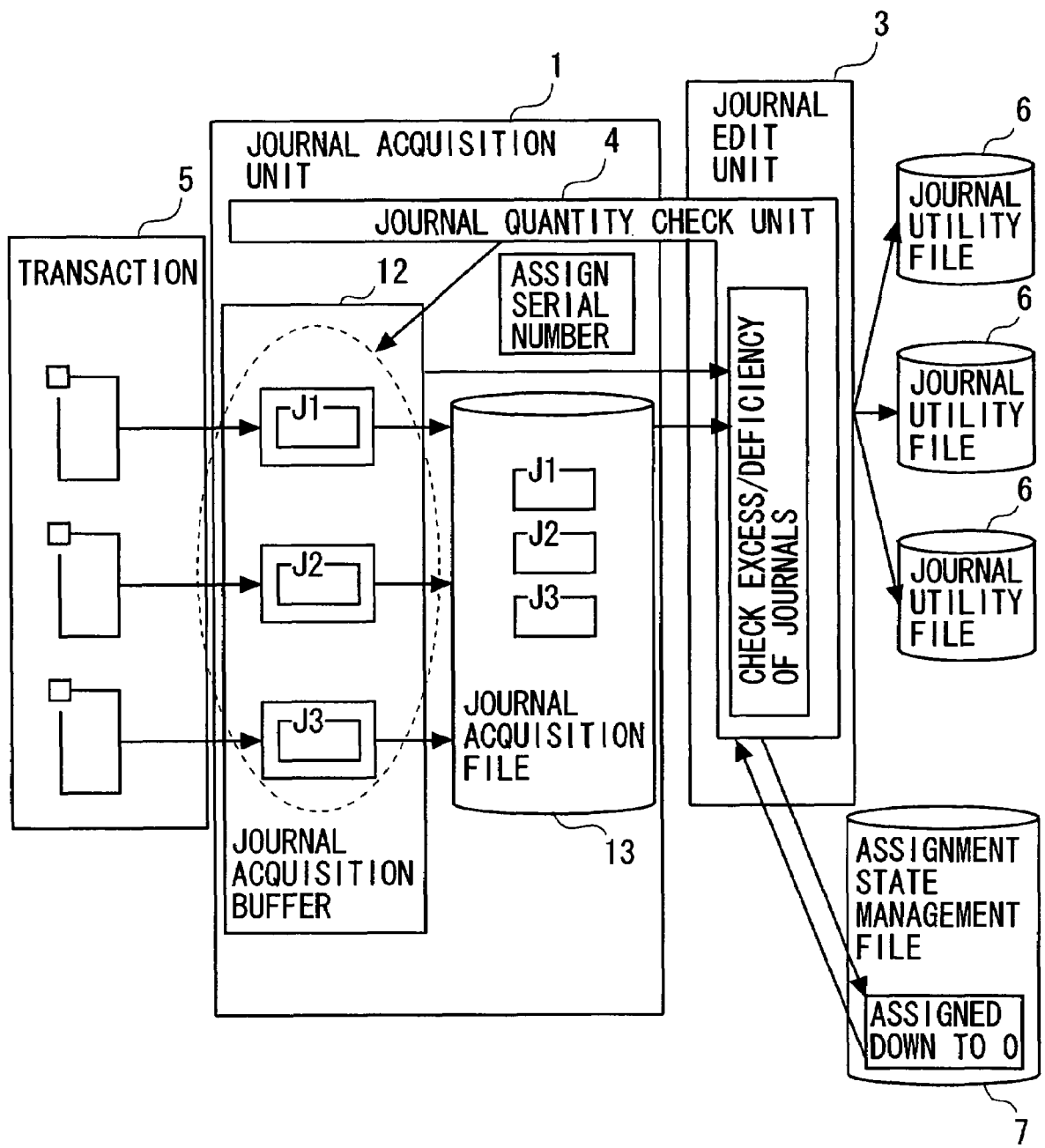
FIG. 10 is a diagram showing a processing method of a journal quantity check unit.
Figure 11:
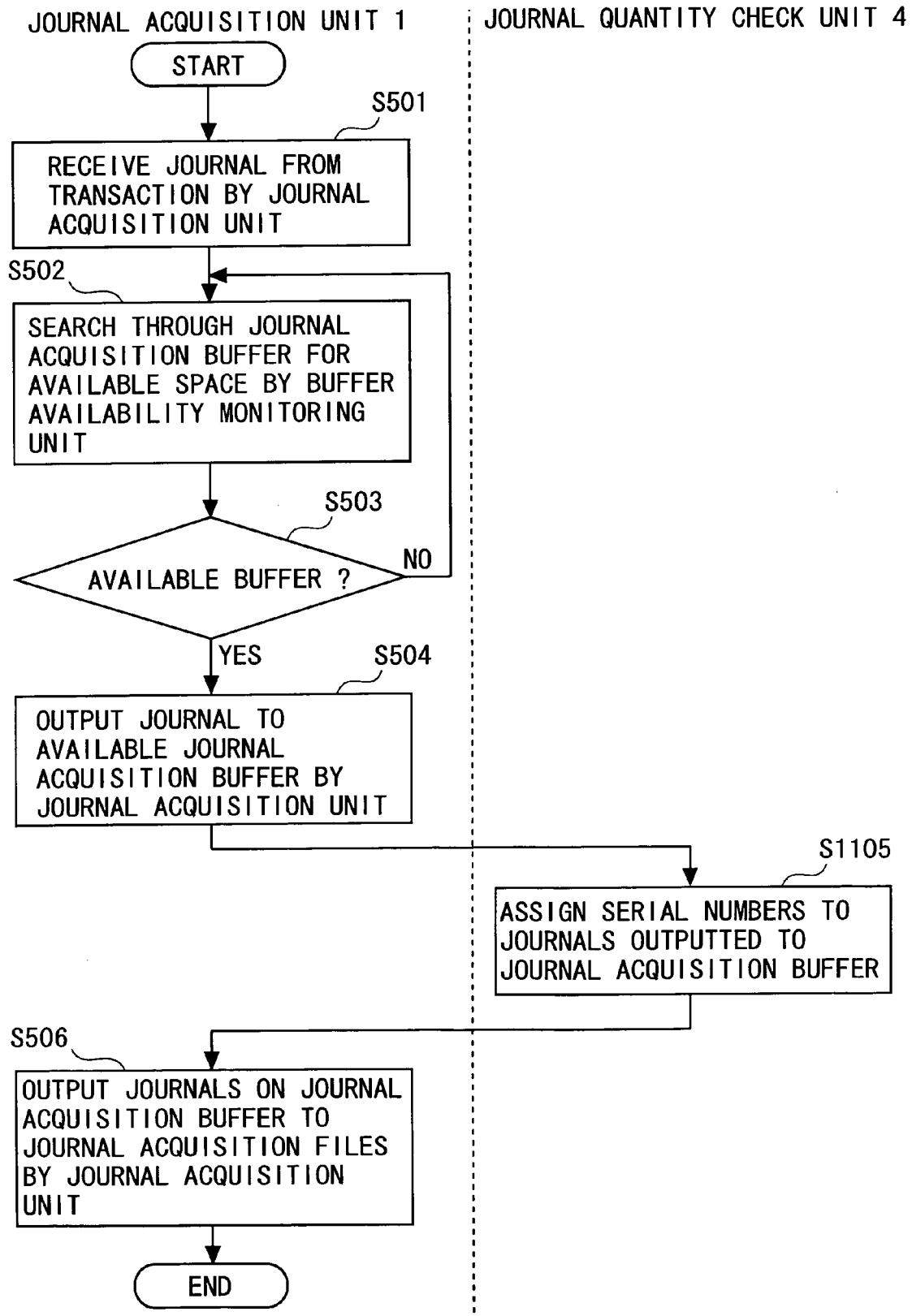
FIG. 11 is a flowchart showing a serial number assigning process by the journal quantity check unit.
Figure 12:
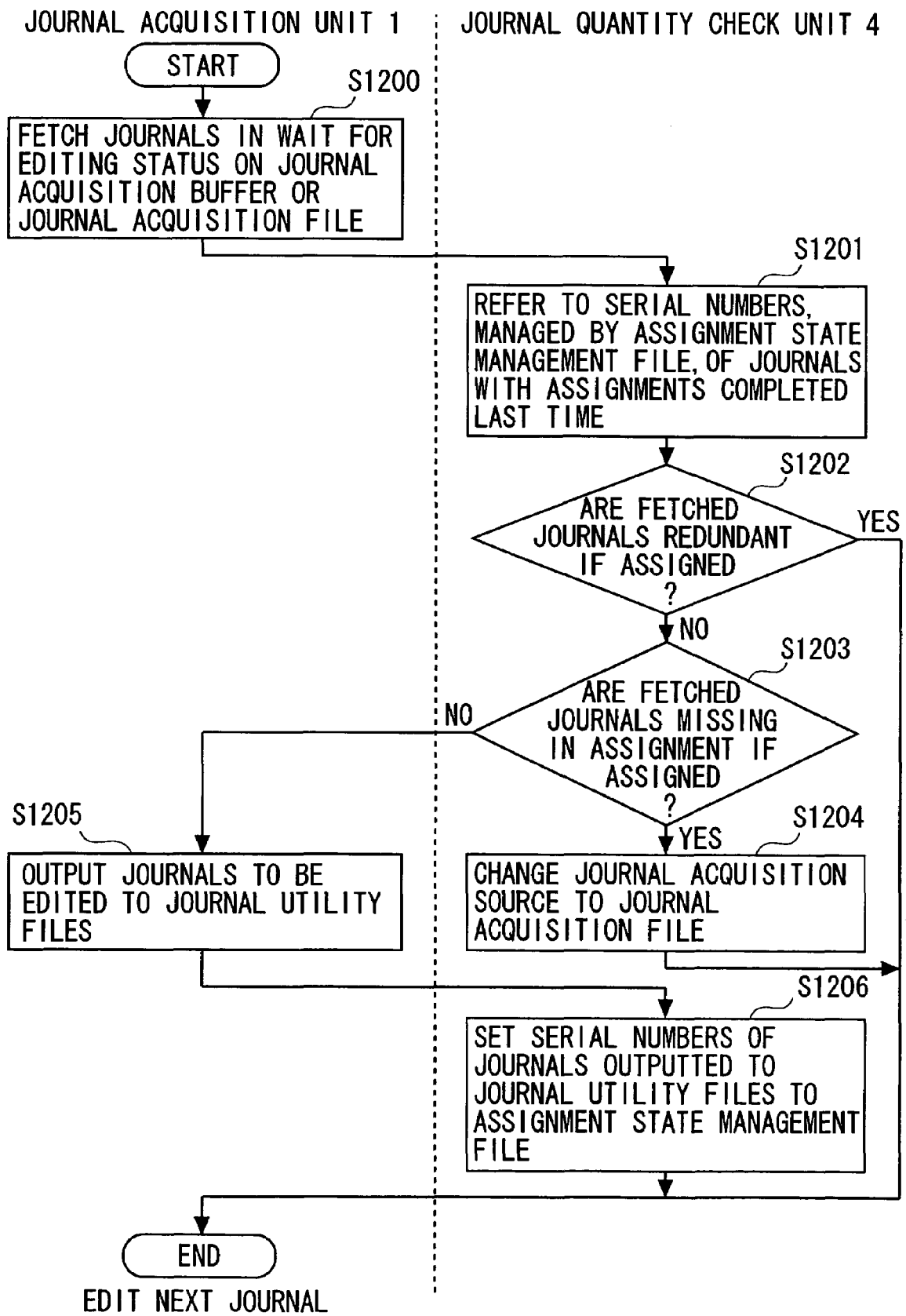
FIG. 12 is a flowchart showing an excess/deficiency check process by the journal quantity check unit.

The processing method of the journal quantity check unit 4 is explained referring to FIGS. 10 through 12. The journal quantity check unit 4 assigns the serial numbers to the respective journals outputted by the journal acquisition unit 1. Further, the journal quantity check unit 4 checks the excess and deficiency of the journals acquired by the journal edit unit 3.

The journal quantity check unit 4, upon such a trigger that the journal acquisition unit 1 has acquired the journals from the journal acquisition buffer 12, assigns the serial numbers to the respective journals.

Further, the journal quantity check unit 4, upon such a trigger that the journal edit unit 3 has outputted the journals to the journal utility file 6, sets the serial numbers assigned to the outputted journals to the assignment status management file 7. The assignment status management file 7 serves to manage the serial numbers of the journals already assigned to the journal utility files 6.

Moreover, the journal quantity check unit 4, upon such a trigger that the journal edit unit 3 has fetched the journals from the journal acquisition buffer 12 or the journal acquisition file 13 and edited the same journals, checks the excess and the deficiency of the journals by comparing the serial numbers managed by the assignment status management file 7 with the serial numbers of the fetched journals.

As a result, the journal, if redundant, is discarded, and the next journal is processed. On the other hand, if deficient of the journal, the journal edit unit 3 fetches the journal, mapping to the serial number managed by the assignment status management file 7, from the journal acquisition file and edits the same journal. Namely, if there is a leakage of the journal, the journal edit unit 3 fetches and edits the journal given a serial number next to the serial number of the already-assigned journal, which is managed by the assignment status management file 7.

At first, a processing flow of assigning the serial numbers to the respective journals outputted will be described with reference to FIG. 11.

FIG. 11 shows the processing flow of assigning the serial numbers to the journals.

Upon an output of the journal from the transaction, the journal quantity check unit 4 starts processing. Note that the processing method of the journal acquisition unit 1 has already been described referring. to the processing flow of the journal acquisition unit 1 shown in FIG. 5, and therefore its explanation is omitted by marking those processes with the same symbols.

The journal quantity check unit 4, after the journal acquisition unit 1 has executed the processes in S501 through S504, assigns the serial numbers to the respective journals to be outputted to the journal acquisition buffer 12 (S1105).

Then, as in the processing flow of the journal acquisition unit 1 shown in FIG. 5, the journal acquisition unit 1 outputs the journal on the journal acquisition buffer 12 to the journal acquisition file 13, thus terminating the processing.

Next, a processing flow of checking the excess and the deficiency of the journals acquired will be explained referring to FIG. 12.

The journal quantity check unit 4, upon the acquisition of the journal in a wait-for-editing status on the journal acquisition buffer 12 or the journal acquisition file 13 by the journal edit unit 3, starts processing (S1200). This corresponds to the process in S902 or S903 in FIG. 9.

To begin with, the journal quantity check unit 4 refers to the journal serial numbers, of which the assignments have been completed last time, managed by the assignment status management file 7 (S1201).

The journal quantity check unit 4 judges, if the fetched journal is assigned, whether the journals become redundant or not (S1202).

Herein, the journal quantity check unit 4 judges, even if the fetched journal is assigned, that the journals dot become redundant. In this case, the journal quantity check unit 4 judges, if the fetched journal is assigned, whether there comes to a leakage of the journal assigned or not (S1203).

Herein, the journal quantity check unit 4 judges, if the fetched journal is assigned, that there comes to the leakage of the journal assigned. In this case, the journal quantity check unit 4 next changes the journal acquisition source to the journal acquisition file 13 (S1204) Then, the journal quantity check unit 4 finishes processing.

Note that the journal edit unit 3, after the journal quantity check unit 4 has changed the journal acquisition source to the journal acquisition file, fetches the journal from a location mapping to the serial number set to the assignment status management file 7. It is therefore possible to restrain the leakage of the journal assigned.

On the other hand, the journal quantity check unit 4, when judging in S1202 that the journals become redundant if the fetched journal is assigned, finishes the journal quantity check process. As a result of this, the journal edit unit 3 discards the redundant journal. Accordingly, the journals can be restrained from being redundant.

While on the other hand, when judging in S1203 that the journals do not become redundant even if the fetched journal is assigned, the journal edit unit 3 edits the journal and outputs it to the journal utility file 6 (S1205).

Subsequently, the journal quantity check unit 4 sets the serial number of the journal outputted to the journal utility file 6 to the assignment status management file 7 (S1206).

Then, the journal quantity check unit 4 terminates the processing.

Note that the journal quantity check unit 4, after finishing the journal quantity check process, waits for an acquisition of a next journal.

<Operation of Journal Acquisition Source Switching Algorithm>

Figure 13:
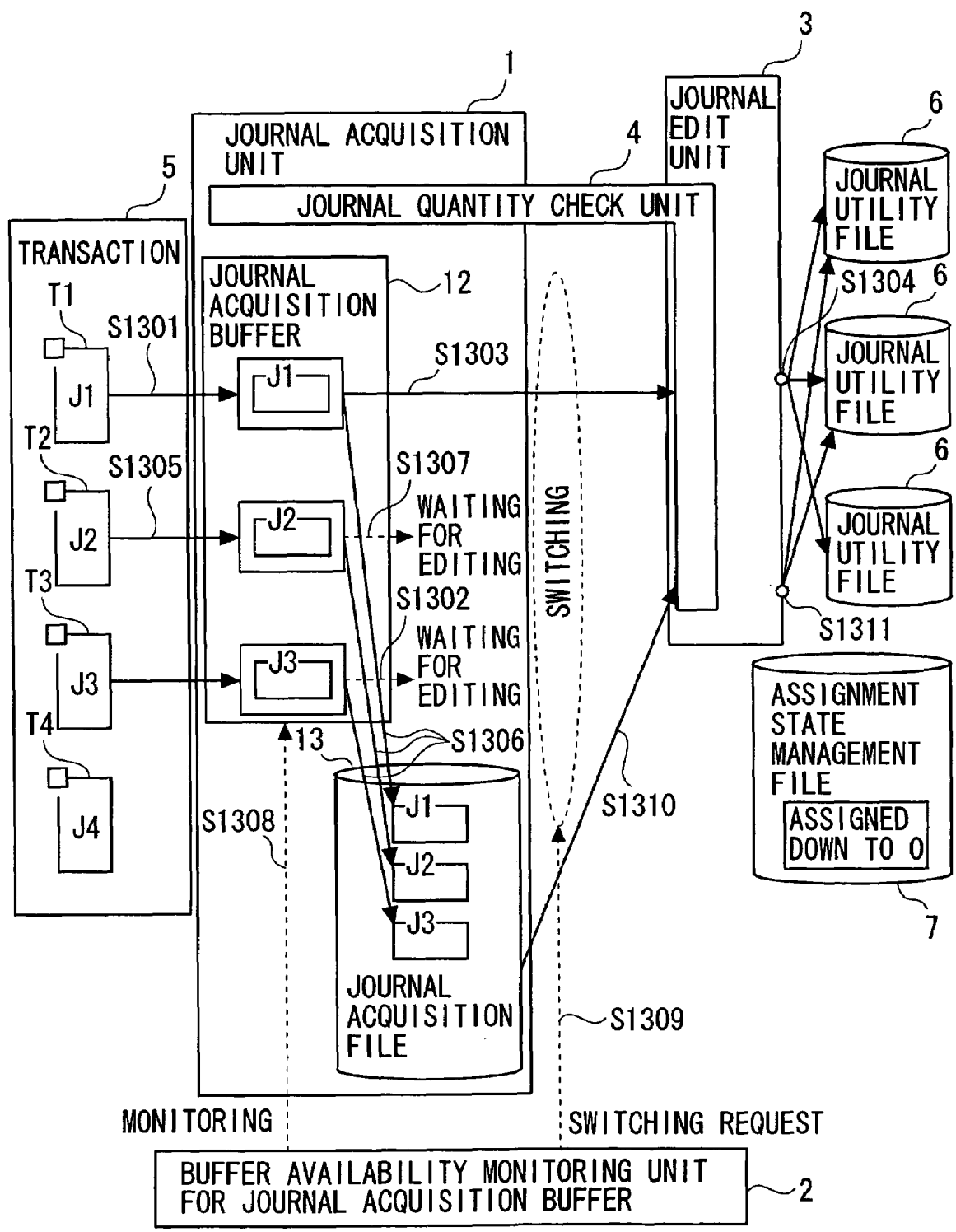
FIGS. 13 through 16 are diagrams showing a switching control method of a journal acquisition source.

An automatic journal acquisition source switching algorithm will be discussed with reference to FIGS. 13 and 14.

Given at first is an explanation of a process of switching over the journal acquisition source to the journal acquisition file 13 from the journal acquisition buffer 12. Note that the journal acquisition source for the journal edit 3 shall be set to the journal acquisition buffer 12 when starting this process.

Upon an end of the transaction T1, the journal acquisition unit 1 outputs the journal J1 to the journal acquisition buffer 12 (S1301) and further outputs it to the journal acquisition file 13 (S1302).

Then, with a trigger of having finished the process of outputting the journal to the journal acquisition file 13 (S1302), the journal edit unit 3 acquires the journal J1 from the journal acquisition buffer 12 (S1303). Thereafter, the journal edit unit 3 outputs the journal to the journal utility file 6, corresponding to an application thereof (S1304).

Further, in the midst of executing the edit process of the journal J1 in S1304, the journal acquisition unit 1 acquires the journals J2, J3 successively from different transactions T2, T3 into the journal acquisition buffer 12 different from the on-edit journal acquisition buffer 12 (S1305). Then, the journals J2, J3 are outputted to the journal acquisition file 13 (S1306). Subsequently, the journals J2, J3 on the journal acquisition buffer 13 comes to a status of waiting for a completion of the edit process of the journal J1 (S1307).

If there occur a large quantity of the journals in the wait-for-edit status as in the case of the journals J2, J3 on the journal acquisition buffer 12, the journal acquisition buffer 12 comes to have no available space. Then, if the journal acquisition buffer 12 has not available space, the journal J4 cannot be outputted from the transaction T4 to the journal acquisition buffer 12, resulting in a delay of the transaction.

For preventing this delay, the journal acquisition buffer availability monitoring unit 2 monitors the availability of the journal acquisition buffer 12 (S1308).

The journal acquisition buffer availability monitoring unit 2, when judging that the available memory space of the journal acquisition buffer 12 is deficient, instructs the journal edit unit 3 to change the journal acquisition source to the journal acquisition file 13 from the journal acquisition buffer 12 (S1309).

Upon receiving this instruction, the journal edit unit 3 fetches the journal from the journal acquisition file 13 (S1310). Then, the journal edit unit 3 outputs the journal to the journal utility file 6, corresponding to an application thereof (S1311).

Herein, the journals are fetched from the journal acquisition file 13 in the sequence of the serial numbers set to the assignment stage management file 7. The assignment status management file 7 is the file for managing the serial numbers of the journals already assigned to the journal utility files 6.

According to this embodiment, the process in S1304 is underway, and hence the status is that the journal J1, i.e., the journal serial number '1', is in the process of being edited. Therefore, journal serial number '0' remains to be set in the assignment status management file 7. Accordingly, the journal edit unit 3 fetches the journal J1, i.e., journal serial number '1', from the journal acquisition file 13.

Namely, in such a case, the journal edit unit 3 fetches the journals in the sequence from J1.

Further, the journal edit unit 3 discards the on-edit journal 1 fetched out of the journal acquisition buffer 12, and fetches afresh the journal J1 from the journal acquisition file 13 as the journal acquisition source. Then, the journal edit unit 3 outputs the journal J1 to the journal utility file 6, corresponding to an application thereof.

The processing method described above enables the edit of the journals to continue without causing the delay in the transaction 5 due to the deficient memory capacity of the journal acquisition buffer 12.

Next, a process of switching over the journal acquisition source to the journal acquisition buffer 12 from the journal acquisition file 13, will be described referring to FIG. 14. Note that the journal acquisition source for the journal edit 3 shall be set to the journal acquisition file 13 when starting this process.

The buffer availability monitoring unit 2 for the journal acquisition buffer 12 monitors an activity ratio of the journal acquisition buffer 12 (S1401).

Then, the buffer availability monitoring unit 2 for the journal acquisition buffer 12, if capable of searching through the journal acquisition buffer 12 for an available memory space on the journal acquisition buffer 12, judges that the deficient memory capacity of the journal acquisition buffer 12 could be obviated.

The buffer availability monitoring unit 2 for the journal acquisition buffer 12, when judging that the deficient memory capacity of the journal acquisition buffer 12 could be obviated, gives the journal edit unit 3 an instruction of changing the journal acquisition source to the journal acquisition buffer 12 from the journal acquisition file 13 (S1402).

Next, the journal acquisition unit 1 outputs all the in-use journals on the journal acquisition buffer 12 to the journal acquisition file 13, thereby setting the journal acquisition buffer 12 in to a completely empty state (S1403).

Subsequently, the journal edit unit 3 fetches the journals down to the last journal J3 acquired into the journal acquisition file 13 (S1404), and outputs the fetched journals J1, J2, J3 to the journal utility files 6, corresponding to applications thereof (S1405).

The journal acquisition unit 1, after outputting all the in-use journals J1 through J3 from on the journal acquisition buffer 12 to the journal acquisition file 13, outputs a new journals J4, J5, J6 to the journal acquisition buffer 12 from the transaction 5 in parallel with the process in S1404 (S1406). The journal acquisition unit 1 outputs these journals to the journal acquisition file 13 (S1407).

Then, the journal edit unit 3, based on the instruction given from the journal acquisition buffer availability monitoring unit 2, after finishing editing the journals on the journal acquisition file 13, fetches the journals J4, J5, J6 from the journal acquisition buffer 12 and edits these journals (S1408), and outputs them to the journal utility files 6, corresponding to their applications (S1409) Namely, the journal edit unit 3 changes over the journal acquisition source to the journal acquisition buffer 12 from the journal acquisition file 13.

At this time, when a plurality of journals are outputted to the journal acquisition buffer 12 from the transaction 5 by the process in S1406, the journal acquisition buffer 12, of which the journal output to the journal acquisition file 13 has been completed, can be again utilized (S1410.

In this case, the journal J7 is stored in the memory area stored so far with the journal J4 on the journal acquisition buffer 12, and this memory area might be overwritten in some cases. Accordingly, when the journal edit unit 3 fetches the journal J5 from the journal acquisition buffer 12, there might a possibility in which the journal J4 is missing.

In such a case, the journal edit unit 3 does not change over the journal acquisition source to the journal acquisition buffer 12 from the journal acquisition file 13, and makes the journal acquisition source remains to be the journal acquisition file 13. Further, till the activity ratio of the journal acquisition buffer 12 is reduced, the journal acquisition buffer availability monitoring unit 2 monitors the availability of the buffer 12.

According to the processing method described above, if the quantity of the transaction 5 is small, the journal edit unit 3 fetches the journal directly from the journal acquisition buffer 12 and edits it. As a result, the high-speed journal edit can be actualized.

<Modified Example>

Figure 15:
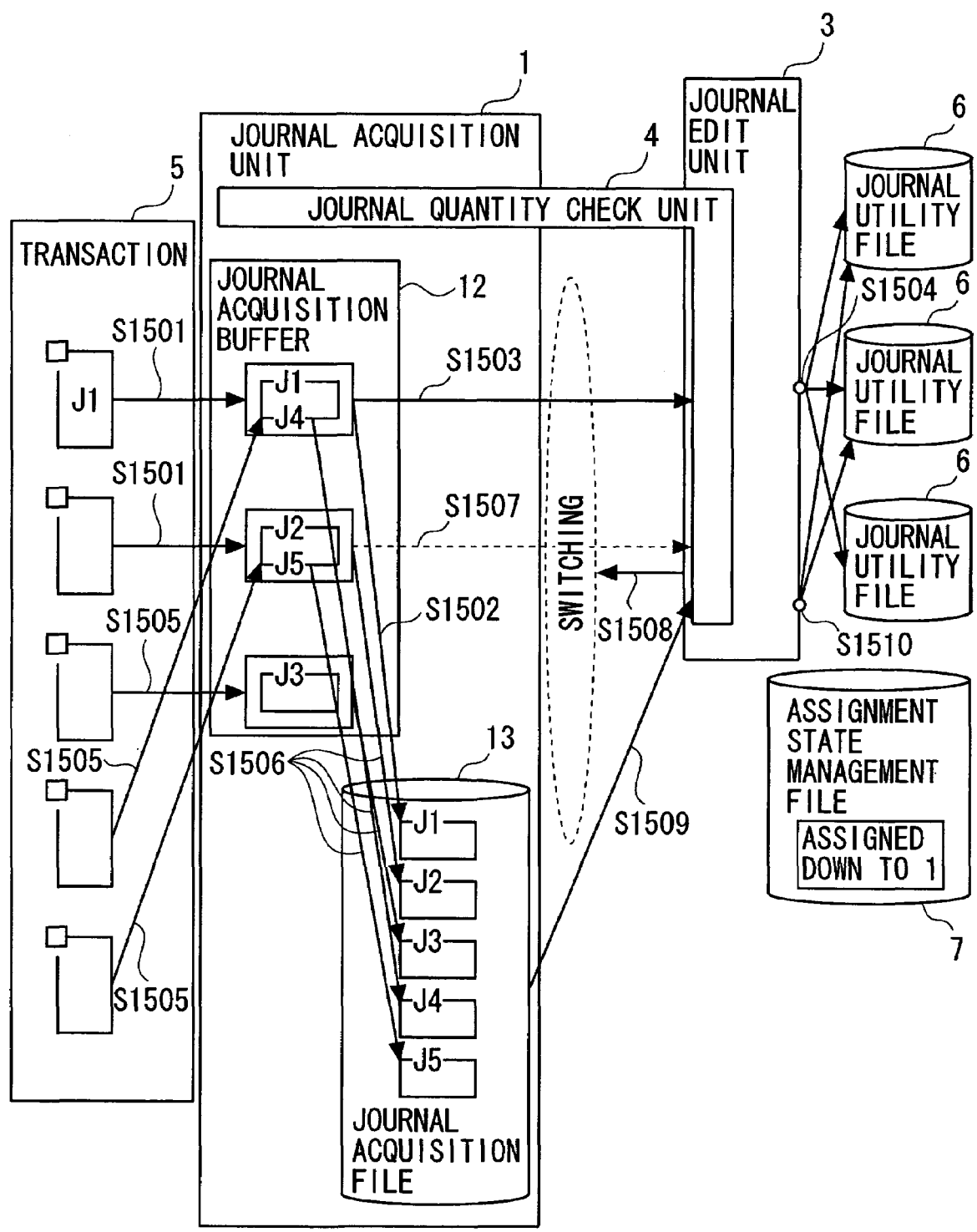
Figure 16:
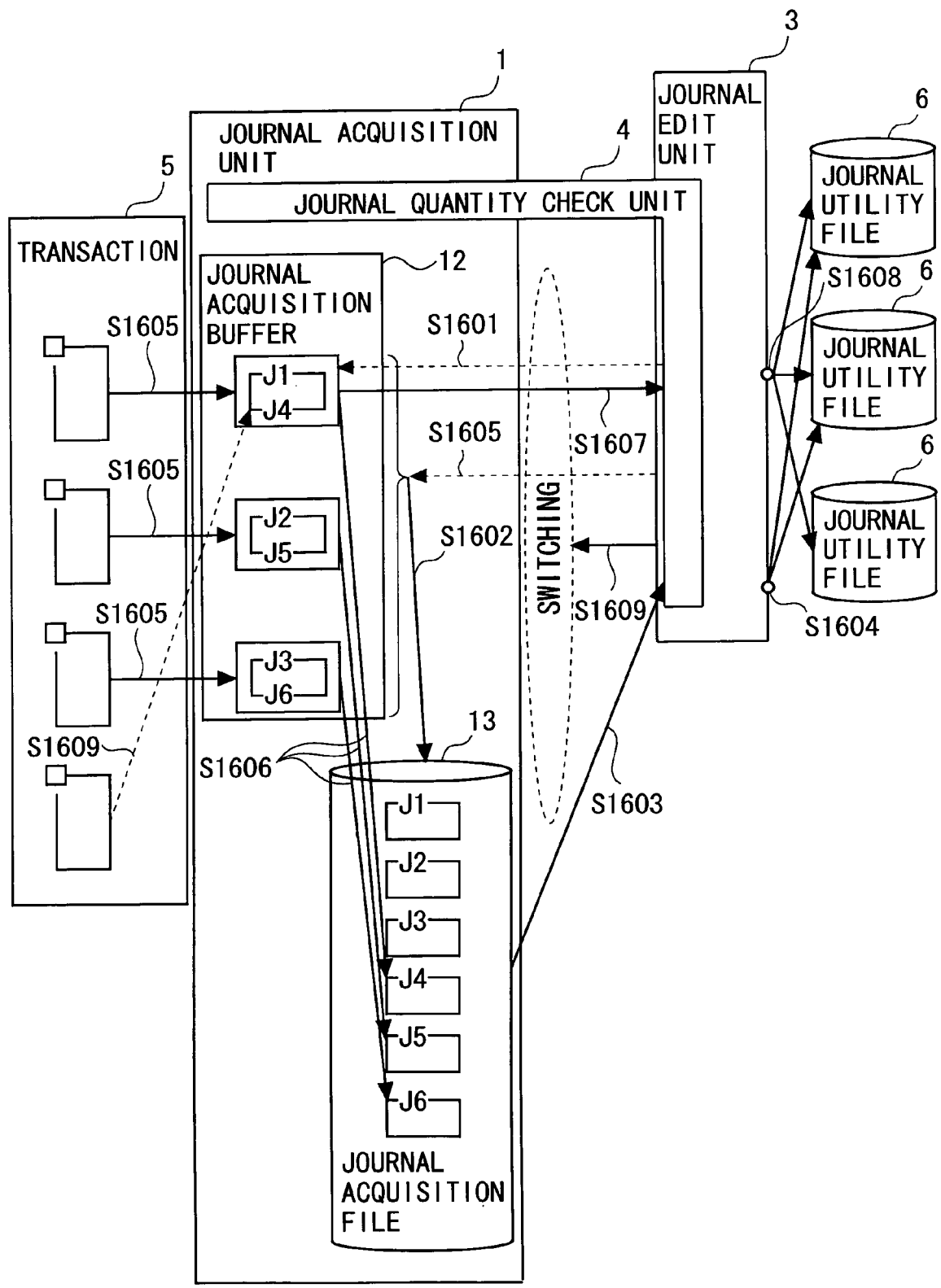

A modified example of the automatic journal acquisition source switching algorithm will be explained referring to FIGS. 15 and 16.

To start with, a process of switching over the journal acquisition source to the journal acquisition file 13 from the journal acquisition buffer 12, will be described with reference to FIG. 15. A different point from the embodiment illustrated in FIG. 13 is that the buffer availability monitoring unit 2 for the journal acquisition buffer 12 is not provided. To be specific, according to this modified example, the journal quantity check unit 4 switches over the journal acquisition source for the journal edit unit 3 without using the buffer availability monitoring unit 2 for the journal acquisition buffer 12. Note that the journal acquisition source for the journal edit 3 shall be set to the journal acquisition buffer 12 when starting this process.

At first, upon an end of the transaction, the journal acquisition unit 1 outputs the journals J1 through J3 to the journal acquisition buffer 12 (S1501) and further outputs them to journal acquisition file 13 (S1502).

Then, with a trigger that the process of outputting the journals to the journal acquisition file 13 (S1502) is terminated, the journal edit unit 3 acquires the journal J1 from the journal acquisition buffer 12 (S1503). Thereafter, the journal edit unit 3 outputs the journal to the journal utility file 6, corresponding to an application thereof (S1504).

Herein, when the journal edit unit 3 finishes outputting the journal J1 to the journal utility file 6, the memory area, stored so far with the journal J1, on the journal acquisition buffer 12 becomes again usable.

Moreover, the memory area stored with the wait-for-editing journal, i.e., the journal J2 on the journal acquisition buffer 12 is also usable after finishing the output to the journal acquisition file 13.

Accordingly, the journals are successively outputted from different transactions and further outputted also to the journal acquisition file 13. Referring to, e.g., FIG. 15, the journals J4, J5 are outputted respectively to the memory areas stored with the journals J1, J2 on the journal acquisition buffer 12 from the transactions with their processing finished (S1505).

Namely, the memory areas, stored so far with the journals J1, J2 which are already outputted to the journal acquisition file 13, on the journal acquisition buffer 12 are over written by the journals J4, J5 having the journal serial numbers '4' and '5' on the journal acquisition buffer 12 (S1505).

Thereafter, the journal edit unit 3 fetches the next journal J5 on the journal acquisition buffer 12 (S1507) At this time, the journal edited and outputted to the journal utility file 6 is the journal J1 having the journal serial number '1'.

Therefore, the journal quantity check unit 4 detects whether any journal among those down to the now-fetched journal J5 having the journal serial number '5', is missing or not.

In such a case, the journal quantity check unit 4 instructs the journal edit unit 3 to switch over the journal acquisition source to the journal acquisition file 13 from the journal acquisition buffer 12.

Then, the journal edit unit 3 fetches the journals in sequence from the journal mapping to the serial number managed by the assignment status management file 7 from on the journal acquisition file 13 (S1509).

As discussed above, according to this modified example, the journal J1 has already been outputted to the journal utility file 6 from the journal edit unit 3, and therefore journal serial number '1' is set to the assignment status management file 7. Accordingly, the journal edit unit 3 fetches the journals headed by the journal J2, i.e., the journal serial number 2, from on the journal acquisition file 13.

Then, the journal edit unit 3 outputs the journals to the journal utility files 6, corresponding to their applications (S1510).

The processing method described above prevents an occurrence of the delay in the transaction 5 due to the deficient memory capacity of the journal acquisition buffer 12. Further, the information management system of the present invention is capable of continuing to edit the journals without causing any leakage of the journals assigned.

Further, this modified example does not involve using the buffer availability monitoring unit 2 for the journal acquisition buffer 12, and hence the journal acquisition unit 1 searches through the journal acquisition buffer 12 for an available space, thus judging whether there is an available buffer area on the journal acquisition buffer 12. That is, the process in S502 explained in FIG. 5 is executed not by the buffer availability monitoring unit 2 for the journal acquisition buffer 12 but by the journal acquisition unit 1.

Given next is a description of a process of switching over the journal acquisition source to the journal acquisition buffer 12 from the journal acquisition file 13.

Figure 14:
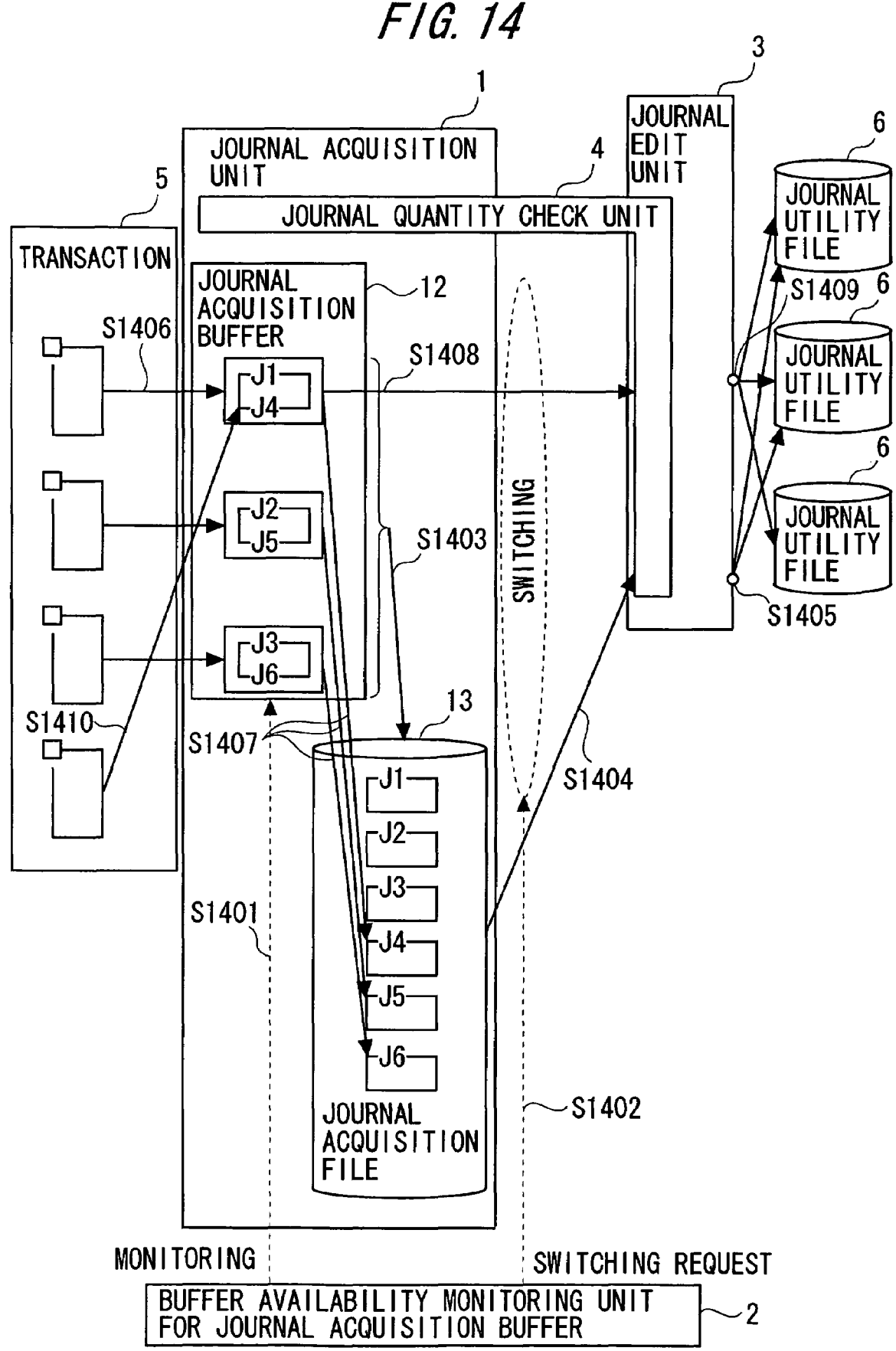

A different point from the embodiment illustrated in FIG. 14 is that the journal acquisition buffer availability monitoring unit 2 is not provided. Namely, according to this modified example, the journal quantity check unit 4 switches over the journal acquisition source for the journal edit unit 3 without the journal acquisition buffer availability monitoring unit 2.

Note that the journal acquisition source for the journal edit 3 shall be set to the journal acquisition file 13 when starting this process.

The journal edit unit 3 has set the journal acquisition source to the journal acquisition file 13, and therefore the journals on the journal acquisition buffer 12 are not referred to by the journal edit unit 3.

Such being the case, the journal quantity check unit 3 issues to the journal acquisition unit 1 an instruction of outputting the journals on the journal acquisition buffer 12 to the journal acquisition file 13 (S1601).

Upon receiving this instruction, the journal acquisition unit 1 outputs all the in-use journals on the journal acquisition buffer 12 to the journal acquisition file 13, thereby putting the journal acquisition file 1*n* into the completely empty state (S1602).

The journal edit unit 3 fetches the journals down to the last journal J3 acquired into the journal acquisition file 13 in S1602 (S1603), and further outputs the fetched journals to the journal utility files 6, corresponding to the applications thereof (S1604).

The journal acquisition unit 1, after outputting all the in-use journals J1 through J3 from on the journal acquisition buffer 12 to the journal acquisition file 13, outputs journals J4 through J6 to the journal acquisition buffer 12 from the transaction 5 with its processing finished in parallel with the process in S1603 (S1605).

The journal acquisition unit 1 acquires afresh the journals J4 through J6 from the transaction into the journal acquisition buffer 12 (S1605), and outputs these journals to the journal acquisition file 13 (S1606).

Then, the journal edits unit 3 fetches the journals J4 through J6 from the journal acquisition buffer 12 (S1607), and instructs the journal quantity check unit 4 to check a continuity of the journal serial numbers. Thereafter, the journal edit unit 3 outputs the journals J4 through J6 to the journal utility files 6, corresponding to their applications (S1608).

Herein, the journal quantity check unit 4, when judging that there are neither missing nor redundant journals, instructs the journal edit unit 3 to switch over the journal acquisition source to the journal acquisition buffer 12 from the journal acquisition file 13 (S1609).

On the other hand, the journal quantity check unit 4, when judging that there is the missing journal, instructs the journal edit unit 3 to fetch the journals in sequence from those mapping to the serial numbers managed by the assignment status management file 7. Then, the journal edit unit 3 continues to fetch the journals from the journal acquisition file 13 without executing the process of changing the journal acquisition source.

Further, the journal quantity check unit 4, when judging that there is the redundant journal, instructs the journal edit unit 3 to discard the redundant journal. Then, the journal edit unit 3 continues to fetch the journals successively from the journal acquisition file 13 without executing the process of changing the journal acquisition source.

<Readable-by-Computer Storage Medium>

A program read by a computer to execute any one of the processes in the embodiment discussed above can be stored on a readable-by-computer storage medium. Then, the computer reads and executes the program on this storage medium, thereby providing functioning of the journal acquisition system exemplified in the embodiment discussed above.

Herein, the readable-by-computer storage medium includes storage mediums capable of storing information such as data, programs, etc. electrically, magnetically, optically and mechanically or by chemical action, which can be all read by the computer. What is demountable out of the computer among those storage mediums may be, e.g., a flexible disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

As discussed above, according to the present invention, it is possible to provide the information management system capable of providing the user with the record of the execution in a way that restrains both an increase in processing time and a decrease in throughput of the whole information processing system due to the wait for outputting the record of the execution even when there are a large quantity of records of the executions.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An information management system for managing an execution record of information processing, comprising:
a first storage unit;
a second storage unit storing the execution record at a lower speed than said first storage unit;
an acquisition unit storing the execution record in said first storage unit and said second storage unit;
an output unit referring to the execution record on said first storage unit or said second storage unit, and outputting the execution record to a predetermined output destination;
an assigning module assigning an identification number to the execution record stored on said first storage unit;
a reading module referring to an identification number of the execution record outputted by said output unit;
a comparing module comparing the identification number assigned to the execution record with the identification number of the execution record outputted by said output unit and checking an excess and a deficiency of the execution record, based on the comparing; and
a switching unit dynamically switching over the reference source of the execution record for said output unit between said first storage unit and said second storage unit, based on the checking by the comparing module.

2. An information management system according to claim 1, wherein the execution record is a journal outputted by a transaction system.

3. An information management system according to claim 1, further comprising a monitoring unit monitoring a state of use of said first storage unit.

4. An information management system according to claim 3, wherein said monitoring unit includes a determining unit determining the reference source of the execution record for said output unit in accordance with the state of use of said first storage unit, and
said switching unit includes a switching module dynamically switching over the reference source of the execution record for said output unit on the basis of said determining unit.

5. An information management method of managing an execution record of information processing, comprising:
storing the execution record on a first storage unit;
storing the execution record on a second storage unit at a lower speed than by said first storage unit;
referring to the execution record on said first storage unit or said second storage unit, and outputting the execution record to a predetermined output destination;
assigning an identification number to the execution record stored on said first storage unit;
referring to an identification number of the execution record outputted;
comparing the identification number of the execution record outputted by said output unit and checking an excess and a deficiency of the execution record, based on the comparing; and dynamically switching over the reference source for said output unit between said first storage unit and said second storage unit, based on the checking.

6. A computer-readable storage medium on which is recorded a program for making a computer execute a management of an execution record of information processing, the program comprising the steps of:

storing the execution record on a first storage unit;

storing the execution record on a second storage unit at a lower speed than said first storage unit;

referring to the execution record on said first storage unit or said second storage unit, and outputting the execution record to a predetermined output destination;

assigning an identification number to the execution record stored on said first storage unit;

referring to an identification number of the execution record outputted;

comparing the identification number assigned to the execution record with the identification number of the execution record outputted by said output unit and checking an excess and a deficiency of the execution record, based on the comparing; and dynamically switching over the reference source for said output unit between said first storage unit and said second storage unit, based on the checking.

* * * * *